US011652939B2

United States Patent
Ono et al.

(10) Patent No.: US 11,652,939 B2
(45) Date of Patent: May 16, 2023

(54) POSITION SENSING APPARATUS, IMAGE FORMING APPARATUS, AND POSITION DETECTION METHOD

(71) Applicants: Hirofumi Ono, Kanagawa (JP); Yutaka Ohmiya, Tokyo (JP)

(72) Inventors: Hirofumi Ono, Kanagawa (JP); Yutaka Ohmiya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/712,188

(22) Filed: Apr. 4, 2022

(65) Prior Publication Data

US 2022/0345579 A1 Oct. 27, 2022

(30) Foreign Application Priority Data

Apr. 27, 2021 (JP) .............................. JP2021-075407

(51) Int. Cl.
*H04N 1/00* (2006.01)
*H04N 1/195* (2006.01)

(52) U.S. Cl.
CPC ..... *H04N 1/00702* (2013.01); *H04N 1/00718* (2013.01); *H04N 1/00734* (2013.01); *H04N 1/00774* (2013.01); *H04N 1/19584* (2013.01); *H04N 2201/04717* (2013.01)

(58) Field of Classification Search
None
See application file for complete search history.

(56) References Cited

U.S. PATENT DOCUMENTS

| 6,791,721 | B1* | 9/2004 | Konogaya | ............ H04N 1/4097 |
| | | | | 348/E5.049 |
| 6,919,974 | B1* | 7/2005 | Ichikawa | ............... H04N 1/031 |
| | | | | 358/475 |
| 8,345,317 | B2* | 1/2013 | Makino | ............. G03G 15/0194 |
| | | | | 358/475 |
| 2002/0168116 | A1* | 11/2002 | Takayama | ............. H04N 1/486 |
| | | | | 250/341.8 |

(Continued)

FOREIGN PATENT DOCUMENTS

| JP | 5-004333 | 1/1993 |
| JP | 2007-055733 | 3/2007 |
| JP | 2008-164933 | 7/2008 |

*Primary Examiner* — Dung D Tran
(74) *Attorney, Agent, or Firm* — Xsensus LLP

(57) ABSTRACT

A position sensing apparatus and a method of detecting a position. The position sensing apparatus includes a scanner configured to emit light to an object to scan an image of the object, and a position detector. In the position sensing apparatus, the scanner outputs a first result of scanning obtained by irradiating the object with visible light and a second result of scanning obtained by irradiating the object with invisible light to the position detector, and the position detector corrects the second result of scanning based on the first result of scanning, and to detect an invisible alignment image based on the corrected second result of scanning. The method includes emitting light to an object using a scanner, obtaining a first result of scanning as the scanner irradiates the object with visible light, and obtaining a second result of scanning as the scanner irradiates the object with invisible light.

8 Claims, 14 Drawing Sheets

(56) References Cited

U.S. PATENT DOCUMENTS

| | | | |
|---|---|---|---|
| 2003/0076416 A1* | 4/2003 | Yamaguchi | H04N 1/4074 |
| | | | 396/564 |
| 2009/0289121 A1* | 11/2009 | Maeda | G06K 7/12 |
| | | | 235/462.06 |
| 2013/0038672 A1 | 2/2013 | Ohmiya | |
| 2016/0100075 A1* | 4/2016 | Chen | H04N 1/04 |
| | | | 358/1.13 |
| 2020/0053230 A1* | 2/2020 | Nakazawa | G07D 7/12 |
| 2020/0412904 A1 | 12/2020 | Ohmiya et al. | |
| 2021/0385384 A1* | 12/2021 | Oh | H04N 1/00702 |
| 2022/0086307 A1 | 3/2022 | Ono et al. | |

\* cited by examiner

SCANNING WITH VISIBLE LIGHT
(SECOND RESULT OF SCANNING)

SCANNING WITH INVISIBLE LIGHT
(FIRST RESULT OF SCANNING)

WHEN IMAGE DATA
IS TO BE OBTAINED

FORMING BLACK IMAGE
USING C COLOR TONER IMAGE,
M COLOR TONER IMAGE,
AND Y COLOR TONER IMAGE

POSITION SENSING APPARATUS, IMAGE FORMING APPARATUS, AND POSITION DETECTION METHOD

CROSS-REFERENCE TO RELATED APPLICATION

This patent application is based on and claims priority pursuant to 35 U.S.C. § 1.19(a) to Japanese Patent Application No. 2021-075407, filed on Apr. 27, 2021, in the Japan Patent Office, the entire disclosure of which is hereby incorporated by reference herein.

BACKGROUND

Technical Field

Embodiments of the present disclosure relate to a position sensing apparatus, an image forming apparatus, and a position detection method.

Background Art

In the related art, the position of a recording sheet tends to change in image forming apparatuses, and there are some cases in which the image on the recording sheet is displaced.

In the related art, technologies are known in the art that corrects the positional displacement of an image on a recording sheet. In such image forming apparatuses known in the art, the position of an invisible mark that is formed on a recording sheet is detected by irradiating the light outside the area of visibility, and the position at which the image is formed is corrected based on the detected position of the invisible mark.

SUMMARY

Embodiments of the present disclosure described herein provide a position sensing apparatus and a method of detecting a position. The position sensing apparatus includes a scanner configured to emit light to an object to scan an image of the object, and a position detector. In the position sensing apparatus, the scanner outputs a first result of scanning obtained by irradiating the object with visible light and a second result of scanning obtained by irradiating the object with invisible light to the position detector, and the position detector corrects the second result of scanning based on the first result of scanning, and to detect an invisible alignment image based on the corrected second result of scanning. The method includes emitting light to an object using a scanner, obtaining a first result of scanning as the scanner irradiates the object with visible light, obtaining a second result of scanning as the scanner irradiates the object with invisible light, correcting the second result of scanning based on the first result of scanning, using a position detector, and detecting an invisible alignment image based on the corrected second result of scanning, using the position detector.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
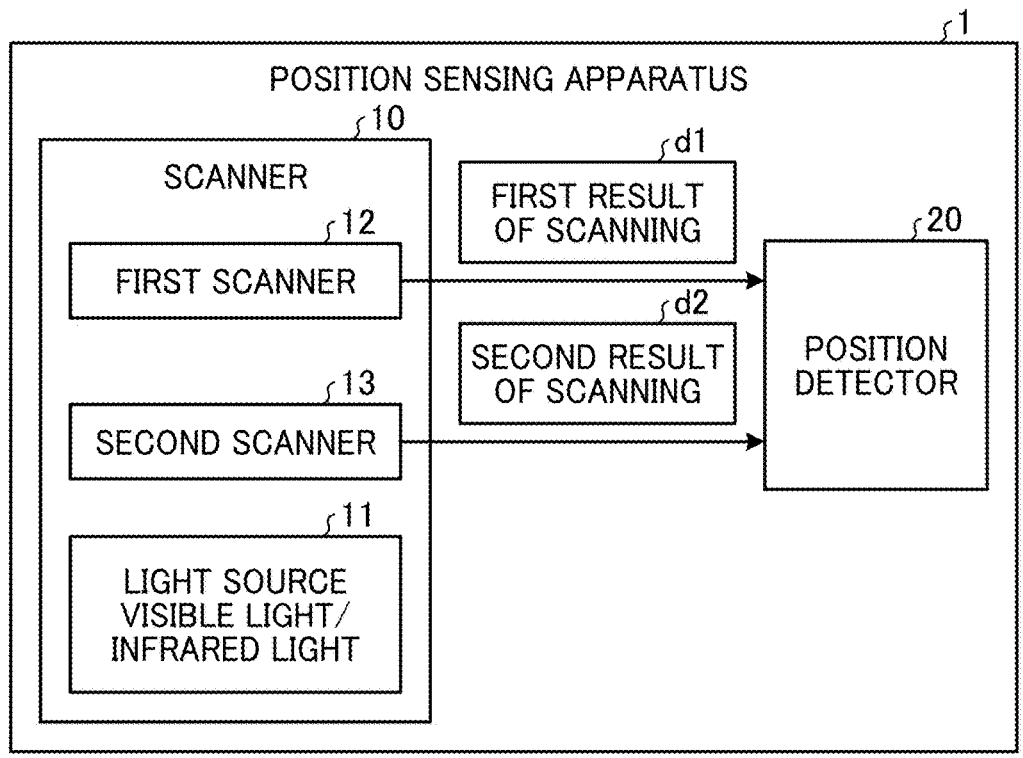
FIG. 1 is a basic configuration diagram of a position sensing apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

A position sensing apparatus, an image forming apparatus, and a position detection method according to an embodiment of the present disclosure are described below in detail with reference to the accompanying drawings.

First Embodiment

FIG. 1 is a basic configuration diagram of a position sensing apparatus according to a first embodiment of the present disclosure.

As illustrated in FIG. 1, the position sensing apparatus 1 includes a position detector 20 and a scanner 10 having a light source 11. The light source 11 according to the present embodiment is a light source of the light that is emitted to an object. The light with which the subject is irradiated includes light in two ranges, i.e., visible light and light in a range outside the visible range. For example, infrared light may be selected as the light in a range outside the visible range. The light in a range outside the visible range that can be selected may be collectively referred to as invisible light in the following description.

The scanner 10 irradiates an object with light, and outputs a first result of scanning d1 that is the result of scanning that is obtained by irradiating the object with visible light and a second result of scanning d2 that is the result of scanning that is obtained by irradiating the object with invisible light. The scanner 10 according to the present embodiment includes a first scanner 12 and a second scanner 13. The first scanner 12 scans the first data readable from a visible range, and outputs the first result of scanning d1. The second scanner 13 scans the second data readable from a range outside the visible range, and outputs the second result of scanning d2.

Regarding, the first result of scanning d1 and the second result of scanning d2, the position detector 20 corrects the second result of scanning d2 based on the first result of scanning d1, and detects alignment data that is invisible under visible light based on the corrected second result of scanning d2. In FIG. 1, the position detector 20 is included in the position sensing apparatus 1. However, no limitation is indicated thereby, and an external device may be used as the position detector 20.

A concrete example of a configuration and operation of the position sensing apparatus 1 according to embodiments of the present disclosure will be described below. In the following description, a recording sheet is used as an example of an object. The object may be, for example, a plastic, a film, a cloth, or other kinds of medium instead of a sheet of paper. Cases in which the first data and the second data are formed on a recording sheet using toner are described by way of example. As will be described later, no limitation is indicated to toner, and other materials may be used to form data on a recording sheet.

Figure 2:
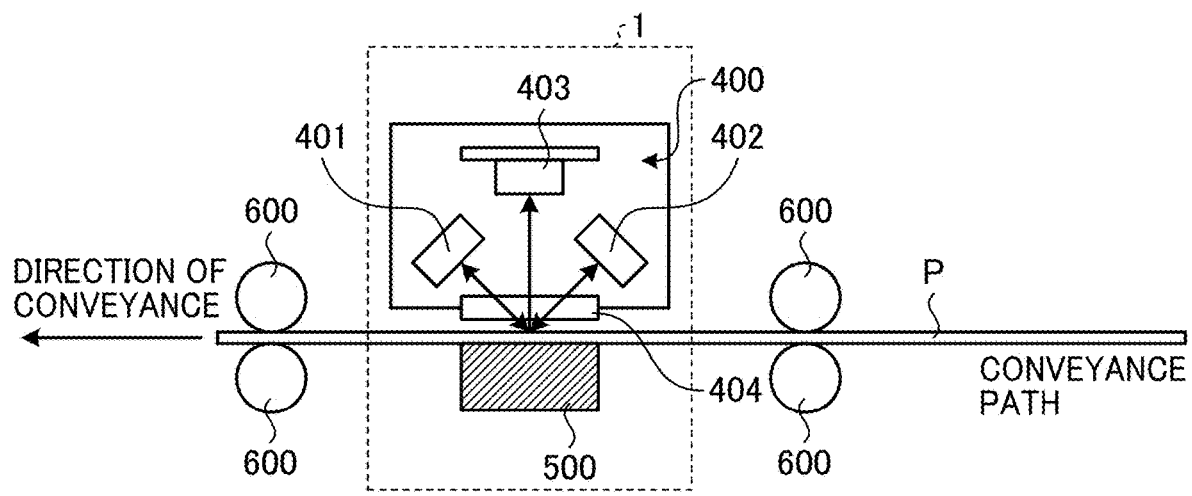
FIG. 2 is a diagram illustrating a configuration of a position sensing apparatus, according to an embodiment of the present disclosure.

FIG. 2 is a diagram illustrating a configuration of the position sensing; apparatus 1, according to the present embodiment.

The sensing apparatus 1 as illustrated in FIG. 2 is provided with a visible-light source unit 401, an infrared light source unit 402, and a sensor 403. As illustrated in FIG. 2, the position sensing apparatus 1 may include a background unit 500. A reading device 400 according to the present embodiment includes the visible-light source unit 401, the infrared light source unit 402, and the sensor 403, and scans and reads an image on the recording sheet P through a scanning window 404.

The visible-light source unit 401 and the infrared light source unit 402 are the light source units used to emit visible light and invisible light, respectively, and are provided for the light source 11. As illustrated in FIG. 2, the visible-light source unit 401 and the infrared light source unit 402 irradiate the recording sheet P with light, and the sensor 403 reads the light reflected by the recording sheet P.

The visible-light source unit 401 according to the present embodiment is a white light-emitting diode (LED) or a plurality of LEDs of multiple colors. The LEDs of multiple colors may be, for example, a red LED, a green LED, and a blue LED, A single LED may be used for each color, or a plurality of LEDs may be used for each color in combination. The infrared light source unit 402 is an infrared LED.

The arrangement of the visible-light source unit 401 and the infrared light source unit 402 as illustrated FIG. 2 is given for the sake of explanatory convenience, and no limitation is indicated thereby. The visible light source unit 401 and the infrared light source unit 402 are not limited to LEDs, and run be any other kinds of light sources.

Figure 3:
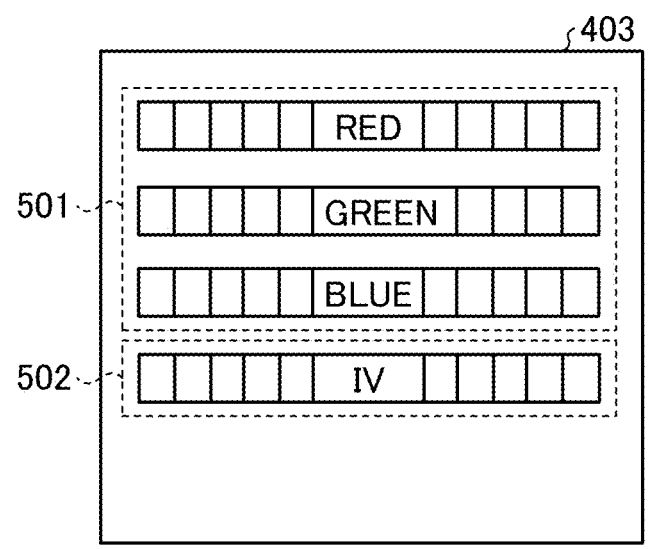
FIG. 3 is a diagram illustrating a configuration of a sensor according to an embodiment of the present disclosure.

FIG. 3 is a diagram illustrating a configuration of the sensor 403 according to the present embodiment.

In the present embodiment described with reference to FIG. 3, a line sensor is used as the sensor 403, The sensor 403 is provided with a first sensor 501 that includes a row of red pixels, a row of green pixels, and a row a blue pixels. The sensor 403 is provided with a second sensor 502 that includes a row of invisible (IV) pixels. The red pixels receive the light of red color, and convert the received red light into an electrical signal. The green pixels receive the light of green color, and convert the received green light into an electrical signal. The blue pixels receive the light of blue color, and convert the received bite light into an electrical signal. The invisible (IV) pixels receive infrared light, and convert the received infrared light into an electrical signal.

The first sensor 501 corresponds to the first scanner 12 that reads the first data, and the second sensor 502 corresponds to the second scanner 13 that reads the second data.

The sensor 403 is configured to be orthogonal to the direction of conveyance of the recording sheet. Due to such a configuration, the sensor 403 can read an image of the recording sheet on a line-by-line basis across the width of the recording sheet. The configuration or structure of the sensor 403 is not limited to such a configuration or structure. For example, the position sensing apparatus 1 may be provided with a main-scanning driving mechanism that drives the sensor 403 in the main scanning direction, and the sensor 403 may scan and read an image of the recording sheet on a line-by-line basis in the width direction of the recording sheet.

The rows of pixels of red, green, and blue (RGB) color are given by way of example, and no limitation is intended to those combinations. For example, when only a plurality of K color toner images are to be read, only one row of pixels of any one of RGB colors may be arranged.

The sensor 403 is not limited to a line sensor in which a row of pixels are arranged, and may be an image sensor. The image transmission mode of the sensor 403 may be a method or system using one of charge coupled device (CCD) or complementary metal oxide semiconductor (CMOS).

The pixels of red, green, and blue (RUB) colors and the invisible (IV) pixels may be driven by the same drive system, or may be driven by different drive systems separately.

FIG. 2 illustrates a conveyance unit that conveys the recording sheet P to the scanning position of the sensor 403. In FIG. 2, the recording sheet P is conveyed in the direction of conveyance by the rotation of the conveyance roller 600 of the conveyance unit, and in so doing, the sensor 403 scans the recording sheet P at the scanning position on a line-by-line basis. As described above, as the recording sheet P is conveyed, the sensor 403 scans the recording sheet P in the sub-scanning direction, i.e., the direction parallel to the length of the recording sheet P.

The background unit 500 is read as a background of the recording sheet P when the first scanner 12 reads the recording sheet P at the scanning position. The edges of the recording sheet P are detected from the result of scanning based on the differences in read values due to, for example, the differences in color or pattern between the recording sheet P and the background unit 500. Some examples of the materials for the background unit 500 will be described later.

In this configuration, the visible light of the visible-light source unit 401 and the infrared light of the infrared light source unit 402 are emitted to the recording sheet P at the scanning position through the scanning window 404, respectively. The result of scanning of the recording sheet P with the irradiation of visible light can be obtained from the first sensor 501 of the sensor 403, and the result of scanning of the recording sheet P with the irradiation of infrared light can be obtained from the second sensor 502 of the sensor 403. Scanning of the recording sheet P by irradiation with visible light may be referred to as scanning with visible light in the following description, and scanning of the recording sheet P by irradiation with invisible light such as infrared light may be referred to as scanning with invisible light in the following description.

Figure 4:
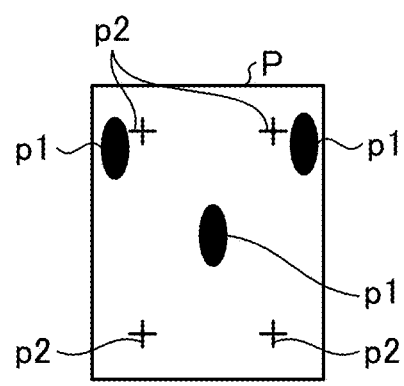
FIG. 4 is a diagram illustrating a configuration of an image on a recording sheet according to an embodiment of the present disclosure.

FIG. 4 is a diagram illustrating a configuration of an image on a recording sheet P according to the present embodiment.

On the recording sheet P illustrated in FIG. 4, an image is formed using toner. Depending on the material used for the toner, an image that can be viewed by human eyes and an image that cannot be viewed by human eyes are formed on the recording sheet when illuminated with visible light. The former is a visible image, and the latter is an image for alignment to be detected by the position sensing apparatus 1.

In FIG. 4, a plurality of K color toner images p1 are formed as visible images on the recording sheet P, and a plurality of IR toner images p2 are formed as images for alignment on the recording sheet P. The multiple IR toner images p2 are formed by IR toner made of a material that absorbs infrared light. The alignment images are satisfactory as long as they are detected by the position sensing apparatus 1. Accordingly, such alignment images may be formed of IR toner that is scanned with invisible light.

The material for forming an image on the recording sheet P is not limited to toner. The forming material may be other kinds of material such as ink. The alignment images are not limited to the cross-shaped mark illustrated by way of example in FIG. 4, and may be changed to any other shapes where appropriate.

Figure 5:
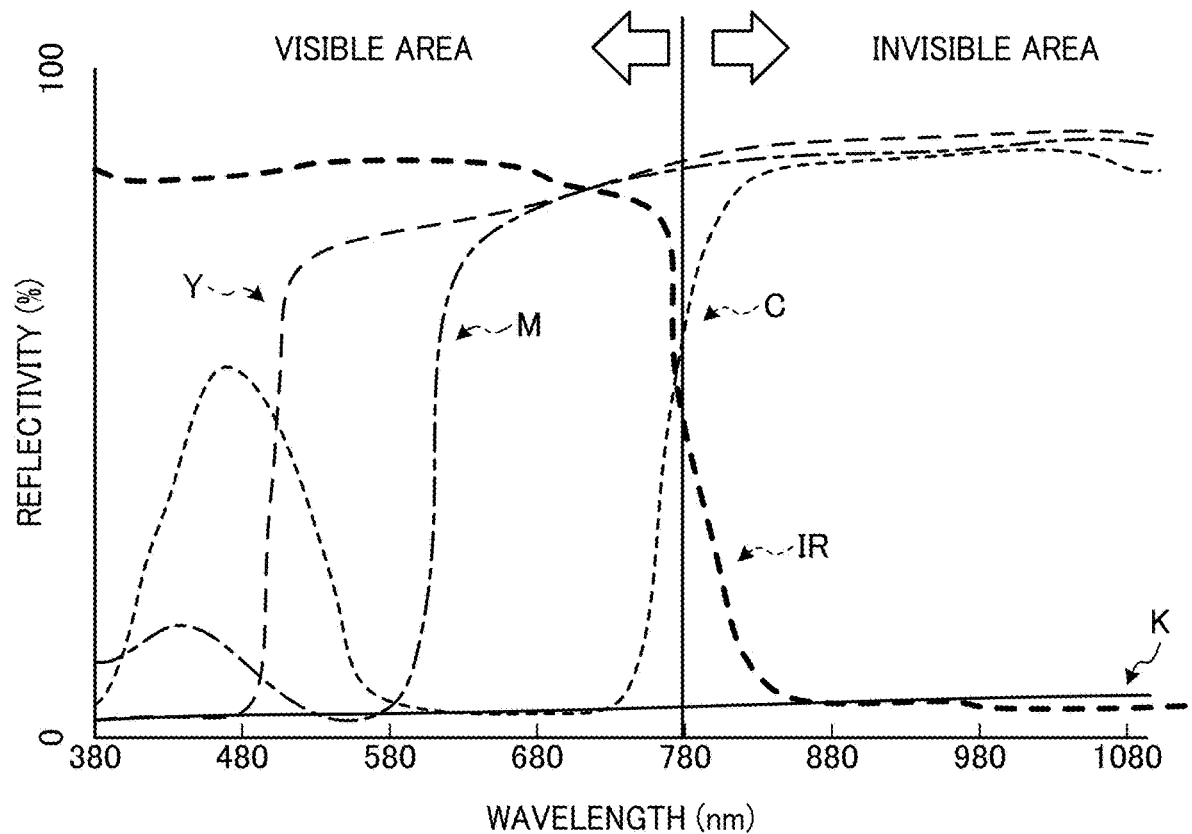
FIG. 5 is a diagram illustrating the spectral reflectance of an image formed on a recording sheet, according to an embodiment of the present disclosure.

FIG. 5 is a diagram illustrating the spectral reflectance of an image formed on a recording sheet P, according to the present embodiment.

By way of example, in FIG. 3, the spectral reflectance of a toner image that is formed on a piece of plain white paper is illustrated. The horizontal axis denotes the wavelength in nanometers (nm), and the vertical axis denotes the reflectivity of light in percentage (%).

FIG. 5 illustrates the spectral reflectance of color toner of cyan (C), color toner of magenta (M), color toner of yellow (Y), and black (K) toner, and infrared (IR) toner, according to an embodiment of the present disclosure.

As illustrated in the invisible area of FIG. 5, all of the light reflectivity of the color toner of cyan, magenta, and yellow (CMY) takes a larger value due to the irradiation with invisible light exceeding 780 nanometers (nm) approximately, but the light reflectivity of IR toner takes a small value. Accordingly, the IR toner images p2 whose read value is small is detected in the second data that is the result of scanning obtained by the second sensor 502. However, the light reflectivity of K color toner is also as low as the light reflectivity of the IR toner in the invisible area. Due to such a configuration, when the K color toner is used to form a visible image, the visible image in the second data tends to be detected with a read value as low as the read value of the IR toner images p2. In other words, the K color toner image p1 is detected as an image in the first data that is the result of scanning or the first sensor 501, and is detected as an image also in the second data without being distinguished from the IR toner images p2.

In this way, by the irradiation of the invisible light, when a material indicating the same characteristics as the IR toner in the invisible area is used in the visible image, the image in which such a material is used is detected as an image in both of the first data and the second data due to the irradiation with invisible light.

The first data and the second data that are read by the sensor 403 are output to, for example, an image processing unit, and are used for positional detection. The image processing unit according to the present embodiment may be functionally implemented by a control program that is stored in a memory such as a read only memory (ROM) and executed by a central processing unit (CPU) in a personal computer or one or more processors provided with the CPU, the ROM, and a random access memory (RAM). Alternatively, some of or all of these functions of the image processing unit may be configured by hardware such as an application-specific integrated circuit (ASIC). The image processing unit according to the present embodiment serves as the position detector 20. The image processing unit may be arranged inside the position sensing apparatus 1 or may be provided for an external device capable of communicating with the position sensing apparatus 1.

Regarding the first result of scanning d1 and the second result of scanning d2, the image processing unit corrects the second result of scanning d2 based on the first result of scanning d1, and detects the alignment data that is invisible under visible light based on the corrected second result of scanning d2. How the second result of scanning is corrected based on the first result of scanning is described below by way of example.

Figure 6:
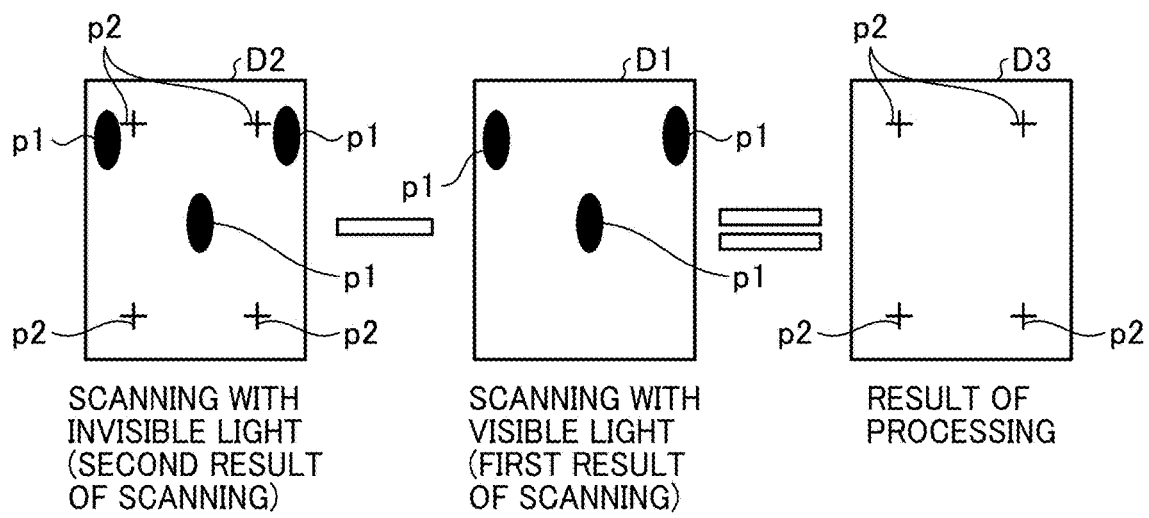
FIG. 6 is a schematic diagram illustrating how the correction is performed by the image processing unit to distinguish a plurality of IR toner images from the other information, according to the first embodiment of the present disclosure.

FIG. 6 is a schematic diagram illustrating how the correction is performed by the image processing unit to distinguish the multiple IR toner images p2 from the other information, according to the first embodiment of the present disclosure.

FIG. 6, an image that indicates the result of scanning is illustrated. The image D1 scanned with visible light that is obtained by the scanning with visible light corresponds to the first data. The infrared image D2 that is obtained by scanning with invisible light corresponds to the second data. As illustrated in FIG. 6, the infrared image D2 includes a plurality of K color toner images p1 of the image D1 scanned with visible light in addition to a plurality of IR toner images p2.

In view of these circumstances, the image processing unit according to the present embodiment performs correcting processes by subtracting the elements in common between the infrared image D2 and the image D1 scanned with visible light. In other words, as schematically illustrated in FIG. 6 with arithmetic symbols "−" and "=", the image processing unit according to the present embodiment subtracts the differences between the infrared image D2 and the image D1 scanned with visible light to obtain a subtracted image D3. In the present embodiment, the image processing unit eliminates from the infrared image D2 the K color toner images p1 included in common between the infrared image D2 and the image D1 scanned with visible light. By so doing, correction is performed in such a manner that the IR toner images p2 remain on the subtracted image D3. The image processing unit according to the present embodiment uses the subtracted image 133, which is obtained as a result of correction performed as above, for alignment.

In the present embodiment, the image processing unit eliminates the differences between the infrared image D2 and the image D1 scanned with visible light to distinguish the IR toner images on the infrared image D2. However, no limitation is indicated thereby, and other kinds of processing may be adopted where appropriate. For example, as treatment in preparation for the elimination of these differences, the image processing unit according to the present embodiment may binarize the values read from each pixel, or may emphasize the K color toner images p1 and the IR toner images p2, which are included in the infrared image D2 and the image D1 scanned with visible light. Alternatively, as treatment in preparation for the elimination of these differences, the image processing unit according to the present embodiment may remove images whose sizes are smaller than a predetermined area as noise. The image processing unit may use any correction method other than the above method in which differences are eliminated as long as the IR toner images p2 can be distinguished as a result based on the infrared image D2 and the image D1 scanned with visible light. For example, the image processing unit according to the present embodiment may perform a comparison between a prescribed threshold value and a read value for each corresponding pixel or corresponding area between the infrared image D2 and the image D1 scanned with visible light, and may distinguish between pixels in common and the other pixels that are not in common, based on the results of the comparison.

As described above, the position sensing apparatus according to the first embodiment of the present disclosure can distinguish invisible alignment data from the other information based on the result of scanning obtained with the irradiation of visible light and the result of scanning obtained with the irradiation of invisible light. As it is not always necessary to perform, for example, arrangement of information that makes the visible image, reduction in the size of the visible image, changes in color, an image for alignment can be detected without depending on an image-forming area such as the visible image.

Second Embodiment

An image forming apparatus to which the position sensing apparatus according to the above embodiment of the present disclosure is applied is described below as a second embodiment of the present disclosure.

Figure 7:
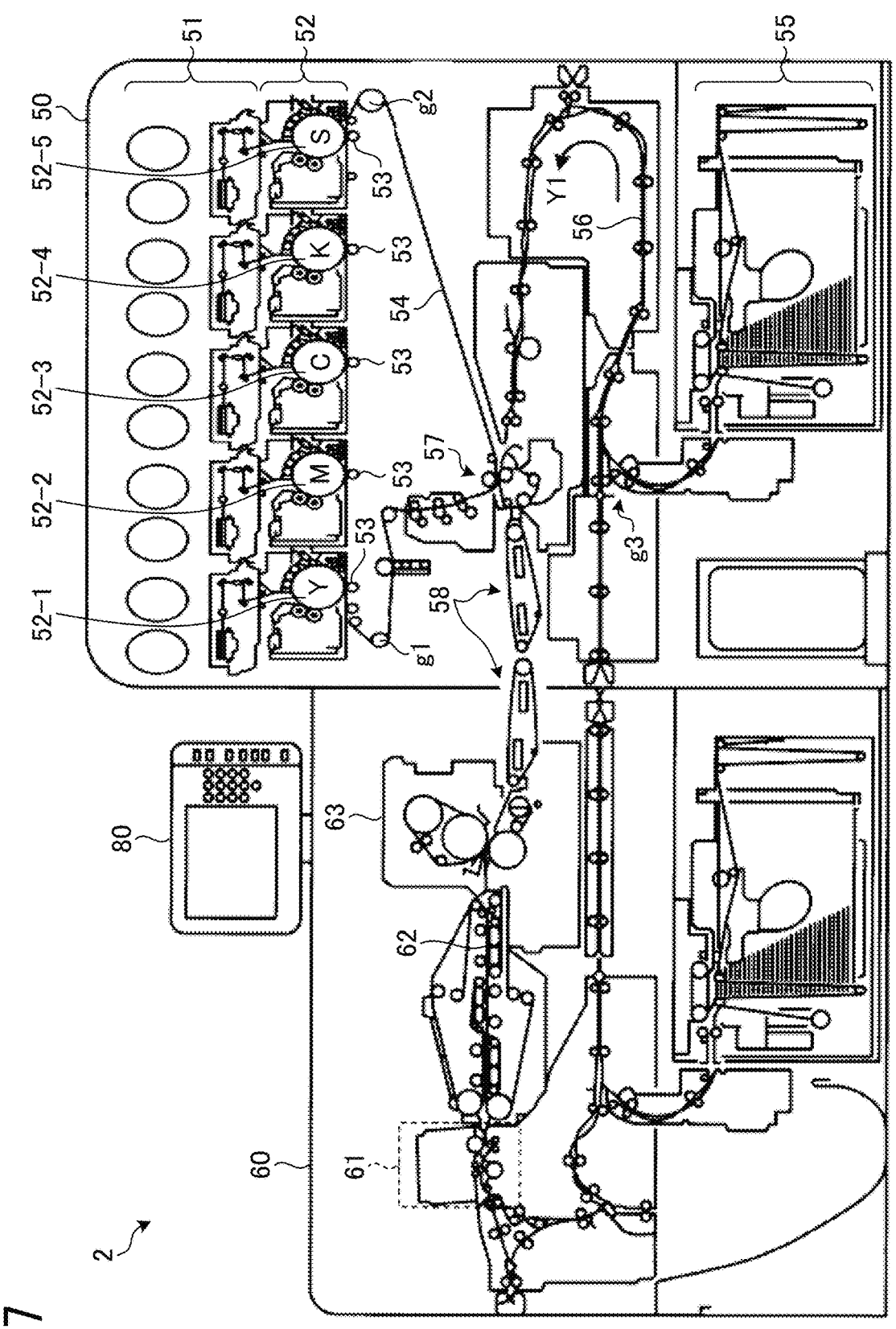
FIG. 7 is a diagram illustrating a configuration or structure of an image forming apparatus according to a second embodiment of the present disclosure.

FIG. 7 is a diagram illustrating a configuration or structure of an image forming apparatus 2 according to a second embodiment of the present disclosure.

The image forming apparatus 2 as illustrated in FIG. 7 includes a controller 30 (see FIG. 8), an image forming device 50, a fixing device 60, and an operation panel 80.

The operation panel 80 is a user interface of the image forming apparatus 2, and includes an input device such as a touch panel or hardware keys that receive input operation of various kinds of settings or commands for execution and an output device such as a liquid crystal display used to display a setting operation screen and a notification screen. The output device may include, for example, a notification lamp and a loudspeaker.

The image forming device 50 includes an image forming unit, and uses the image forming unit to form an image on the recording sheet P. FIG. 7 illustrates an electrophotographic configuration as the configuration of the image forming unit. The formed image in the second embodiment of the present disclosure includes a visible image that can be read under visible light and an invisible alignment image that cannot be read under visible light. The image forming device 50 does not necessarily form such an alignment image on the recording sheet P together with the visible image every time, and may form the alignment image on the recording sheet P at a prescribed timing as appropriate. For example, the controller 30 according to the second embodiment of the present disclosure may instruct the image forming device 50 to form an alignment image, for example, when a visible image is to be formed for the first time after the system is turned on, when a predetermined number of sheets have been printed with a visible image, or when a certain length of time has passed. Alternatively, the controller 30 may be configured to instruct the image forming device 50 to form a plurality of alignment images, for example, when the recording sheet P is to be replaced or when the changes in operating temperatures are detected. When the controller 30 instructs the image forming device 50 to form alignment images, the image forming device 50 may be operated to continuously form a plurality of alignment images for a predetermined number of sheets. In such cases, the controller 30 according to the present embodiment may compute and obtain the amount of correction of the position at which the image has been formed, based on, for example, an average value of the amounts of displacements of the multiple alignment images on each one of the recording sheets.

The configuration or structure of the image forming device 50 is described below in more detail. The image forming device 50 includes an optical writing device 51, a plurality of image forming units 52 that uses a tandem system to form images of multiple plates, a plurality of transfer units 53, an intermediate transfer belt 54, a sheet feeder 55, a conveyance path 56, a secondary transfer roller 57, and a sheet ejection belt 58.

In addition to the photoconductor drums 52-1, 52-2, 52-3, and 52-4 for Y, M, C, and K toners, respectively, one of the multiple image forming units 52 is provided with can S photoconductor drum 52-5. The S photoconductor drum 52-5 is a photoconductor drum that forms an alignment image. By way of example, cases in which infrared (IR) toner is used as the toner of the S photoconductor drum 52-5 are described below.

For example, image forming elements including a charger, a developing device, a transfer unit, a cleaner, and a discharger are arranged around each one of the photoconductor drums 52-1, 52-2, 52-3, and 52-4, and the S photoconductor drum 52-5. An intermediate transfer belt 54 is seamlessly stretched between the multiple transfer units 53 and the photoconductor drums 52-1, 52-2, 52-3, and 52-4, and the S photoconductor drum 52-5 and. The intermediate transfer belt 54 is stretched between a driving roller g1 and a driven roller g2.

The optical writing device 51 writes the image on each one of the plates of yellow (Y), magenta (M), cyan (C), black (K), and S onto corresponding on of the photoconductor drums. The multiple image forming units 52 form toner images of the respective plates of Y, M, C, K, and S by performing an image forming process by the respective image forming elements in the respective photoconductor drums, and transfers the toner images of the respective plates of Y, M, C, K, and S onto an intermediate transfer belt 54 traveling in one direction by the respective transfer units 53. As a result, the visible images that are the toner images of each one of the plates of Y, M, C, and K and the primarily-transferred images of the multiple alignment images that are the IR toner images of the S plate are formed on the intermediate transfer belt 54.

When the intermediate transfer belt 54 further runs and the primarily-transferred image on the intermediate transfer belt 54 reaches the secondary transfer position, the primarily-transferred image is transferred onto the recording sheet P. In other words, the primarily-transferred image is secondary-transferred onto the recording sheet P.

The sheet feeder 55 accommodates a bundle of recording sheets P, and feeds the recording sheets P from an upper side of the bundle of recording sheets. A registration roller pair g3 separates the recording sheets fed from the sheet feeder 55 on a one-piece-by-one-piece basis and supplies the recording sheet to the conveyance path 56.

The conveyance path 56 conveys the recording sheet P fed from the sheet feeder 55 in the direction indicated by an arrow Y1 (see FIG. 7) as the conveyance roller 600 rotates.

The secondary transfer roller 57 is arranged at a secondary transfer position. The secondary transfer roller 57 transfers the primarily-transferred image on the intermediate transfer belt 54 onto the recording sheet P that is being conveyed through the conveyance path 56.

The image forming device 50 sends the recording sheet P on which an image is formed to the fixing device 60 by the sheet ejection belt 58.

The fixing device 60 fixes the image formed on the recording sheet P by the image forming device 50 onto the recording sheet P by pressure and drying.

The fixing device 60 is provided with a position sensing apparatus 61. The position sensing apparatus 61 reads an image from the recording sheet P by the sensor after pressure bonding and drying, and transmits a result of scanning to the controller 30.

The configuration or structure of the fixing device 60 is described below in more detail. The fixing device 60 includes, for example, the position sensing apparatus 61, a cooling unit 62, and a fixing unit 63. The recording sheet P on which an image is formed by the image thrilling device 50 is sequentially sent to the fixing unit 63, the cooling unit 62, and the position sensing apparatus 61. The fixing unit 63 heats and pressurizes the recording sheet P in order to fix an image on the recording sheet P. The cooling unit 62 cools the heated recording sheet P. The position sensing apparatus 61 scans an image from the recording sheet P, and sends the result of scanning to the controller 30. It is not always necessary for the position sensing apparatus 61 to read the image every time. For example, when the image forming device 50 forms an alignment image on a recording sheet P, the position sensing apparatus 61 reads the image on the recording sheet P. The controller 30 detects the positional displacement based on the result of scanning fed hack from the position sensing apparatus 61 and instructs the image forming device 50 to correct the position at which the image has been formed.

Figure 8:
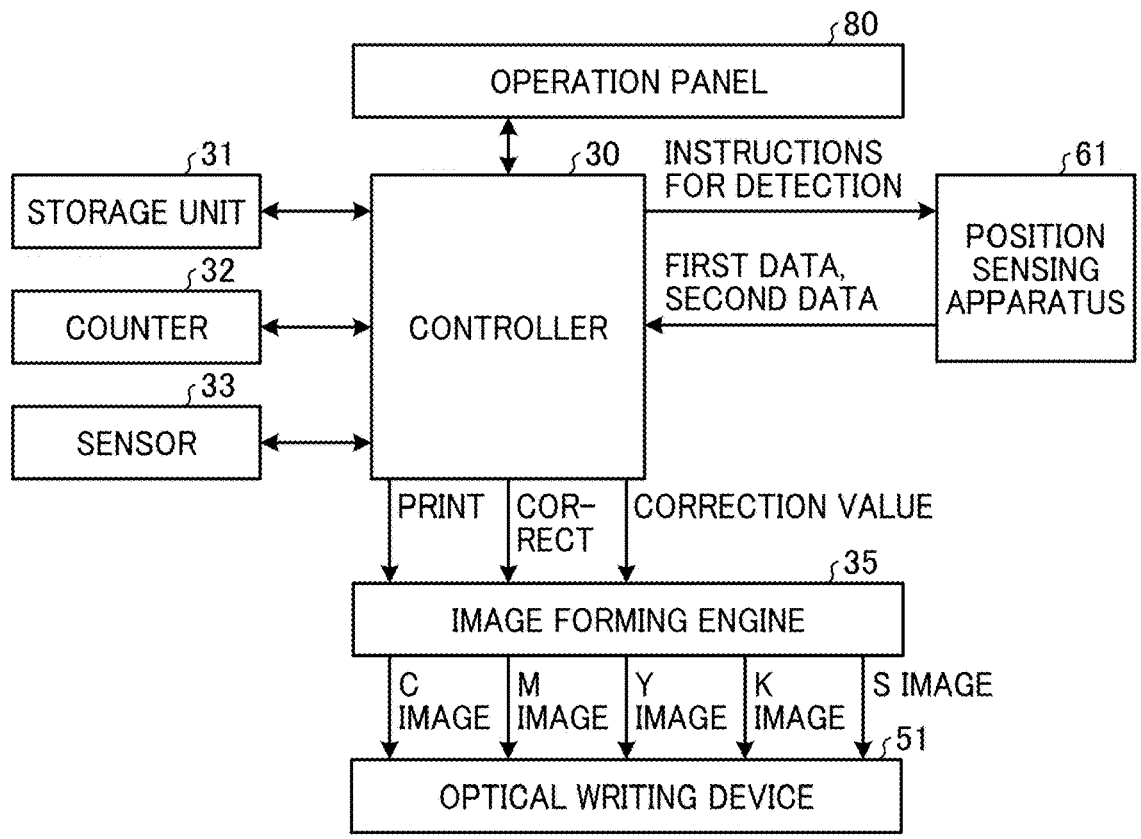
FIG. 8 is a diagram illustrating a configuration of the control blocks of an image forming apparatus according to an embodiment of the present disclosure.

FIG. 8 is a diagram illustrating a configuration of the control blocks of the image forming apparatus 2, according to the present embodiment.

For example, the control processes of the controller 30 as illustrated in FIG. 8 may be functionally implemented by a control program that is stored in a memory such as a ROM and executed by a CPU in a personal computer or one or more processors provided with the CPU, the ROM, and a RAM. Alternatively, some of or all of these functions of the control processes of the controller 30 as illustrated in FIG. 8 may be configured by hardware such as an application-specific integrated circuit (ASIC). The controller 30 may include a functional unit or ASIC that serves as the image processing unit according to the present embodiment.

Upon receiving a print execution instruction from the operation panel 80, the controller 30 outputs print data to the image forming engine 35 to execute printing. In the present embodiment, the source from which the print data is obtained is not limited to any particular source. The print data according to the present embodiment may be any predetermined data read from the storage unit 31 by the controller 30, or may be the data that is sent from a counterpart and then is received by the controller 30 through a communication unit such as a network interface.

The image forming engine 35 drives the image forming device 50 and the fixing device 60 in response to a print execution instruction, forms an image on the recording sheet P fed from the sheet feeder 55 by an electrophotographic method, and fixes the image on the recording sheet P by the fixing device 60. For example, the image forming engine 35 and the image forming device 50 serves as an image forming device.

The controller 30 corrects the position at which the image has been formed at a prescribed timing. For example, the controller 30 according to the present embodiment may correct the position at which the image has been formed when an operation for correction is received through the operation panel 80 by the user or when printing is to be performed for the first time after the system is turned on. Alternatively, the controller 30 according to the present embodiment may correct the position at which the image has been formed when a predetermined number of sheets have been printed or when a certain length of time has passed. For example, the number of printed sheets or the lapse of a certain length of time is counted by a counter 32 coupled to the controller 30. Alternatively, the position at which the image has been formed may be corrected by the controller 30 when the sensor 33 detects the timing at which the recording sheet P is to be replaced or the changes in operating temperatures.

When the position at which the image has been formed is to be corrected, the controller 30 instructs the image forming engine 35 to form the alignment images on the S plate in addition to the formation of the images of the multiple plates of cyan, magenta, yellow and black (CMYK) colors of the print data. When instructed to form a plurality of alignment images, the image forming engine 35 outputs a plurality of fixed alignment images to the optical writing device 51, and forms the multiple alignment images using the S photoconductor drum 52-5. As a result, the alignment images for the fixed position are formed on the recording sheet P together with the visible image.

Figure 9:
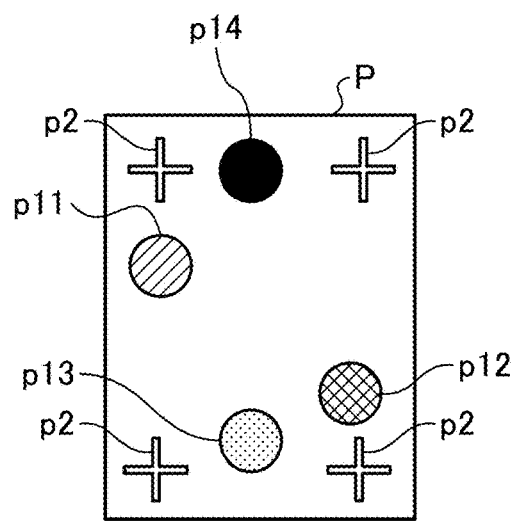
FIG. 9 is a schematic diagram of a recording sheet on which a color visible image and a plurality of alignment images are printed, according to the second embodiment of the present disclosure.

FIG. 9 is a schematic diagram of a recording sheet P on which a color visible image and a plurality of alignment images p2 are primed, according to the present embodiment.

The term printing is used as a synonym for image formation. The term color printing refers to printing in which at least one of cyan, magenta, and yellow (CMY) is used. On the recording sheet P as illustrated in FIG. 9, a color visible tillage is formed by a C color toner image p11, an M color toner image p12, a Y color toner image p13, and a K color toner image p14. The C color toner image p11, the M color toner image p12, the Y color toner image p13, and the K color toner image p14 are included in the schematic diagram of FIG. 9. The position, shape, and area of each color may be determined as desired. In a similar manner to the first embodiment of the present disclosure, the IR toner images p2 according to the present embodiment are also indicated by cross-shaped marks. In the present embodiment, the multiple IR toner images p2 are printed at fixed positions of the four corners of the recording sheet P.

As illustrated in FIG. 8, for example, the position sensing apparatus 61 according to the present embodiment operates in response to instructions for detection sent from the controller 30, and scans and reads the recording sheet P on which a plurality of alignment images have been formed. Then, the read first data and second data are output to the controller 30.

Figure 10A:
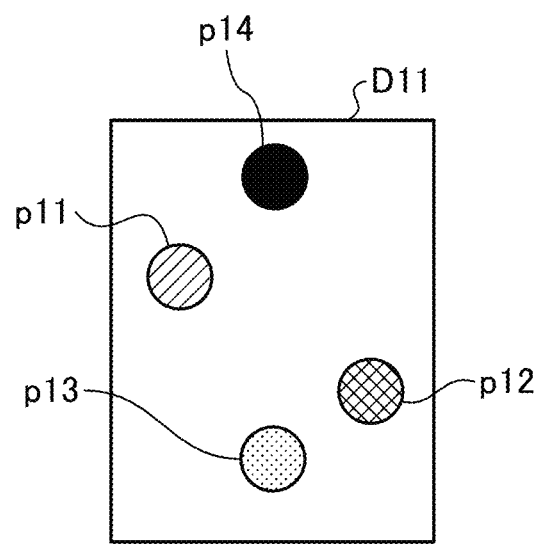
FIG. 10A and FIG. 10B are diagrams each illustrating the images of the first data and the second data that are obtained by scanning the recording sheet of FIG. 9 with a position sensing apparatus, according to the second embodiment of the present disclosure.
Figure 10B:
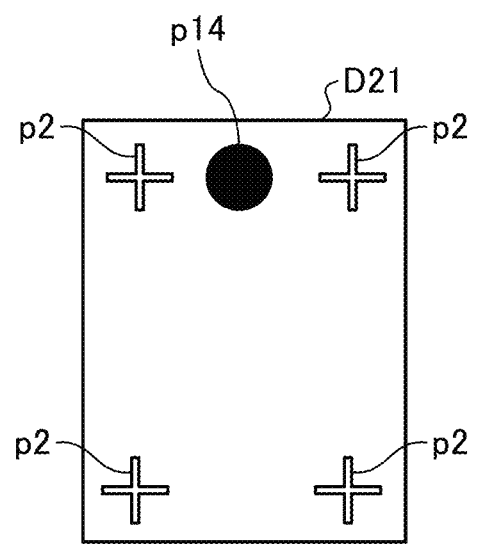

FIG. 10A and FIG. 10B are diagrams each illustrating the images of the first data and the second data that are obtained by scanning the recording sheet P of FIG. 9 with the position sensing apparatus 61, according to the second embodiment of the present disclosure.

As illustrated in FIG. 10A and FIG. 10B, the C color toner image p11, the M color toner image p12, the Y color toner image p13, and the K color toner image p14 are included in an image D11 scanned with visible light. Such an image scanned with visible light corresponds to the first data, and may be referred to as scanned color image the following description. In a similar manner to the first embodiments of the present disclosure, the multiple IR toner images p2 and the K color toner image p14 are included in an infrared image D21 scanned with invisible light. Such an infrared image scanned with invisible light corresponds to the second data.

In FIG. 8, the controller 30 generates, based on the first data and the second data, an image in which the alignment images included in the second data are distinguished from the other images, and detects a positional displacement from the arrangement of the alignment images in the subtracted image. Such an image in which the alignment images are distinguished from the other images is, for example, a subtracted image.

Figure 11A:
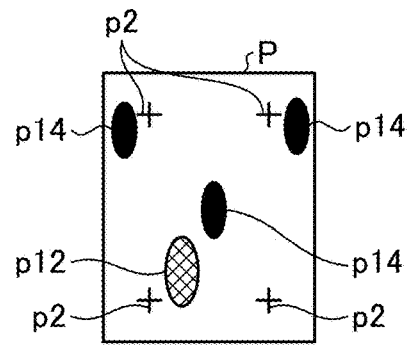
FIG. 11A, FIG. 11B & and FIG. 11C are diagrams each illustrating a method of generating a subtracted image, according to a second embodiment of the present disclosure.
Figure 11B:
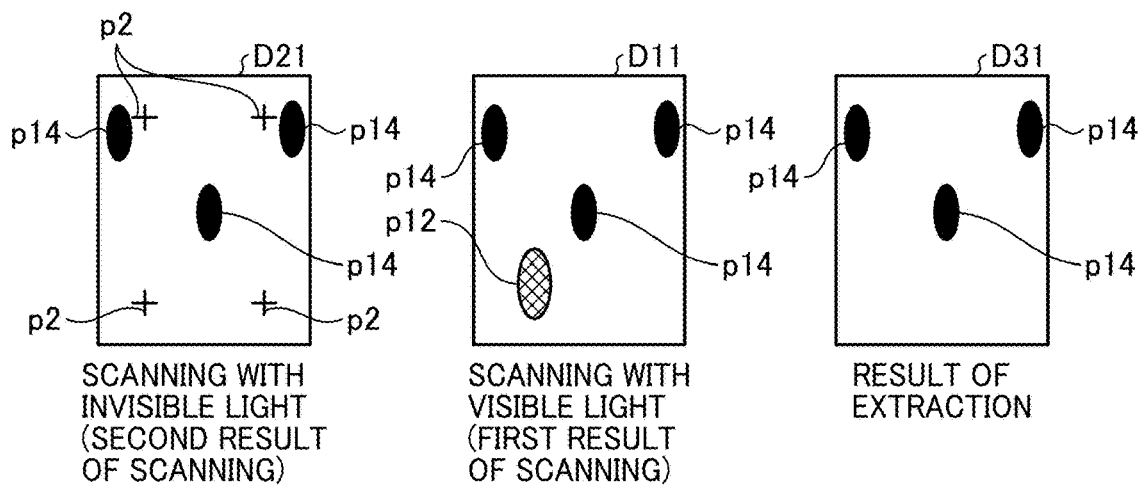
Figure 11C:
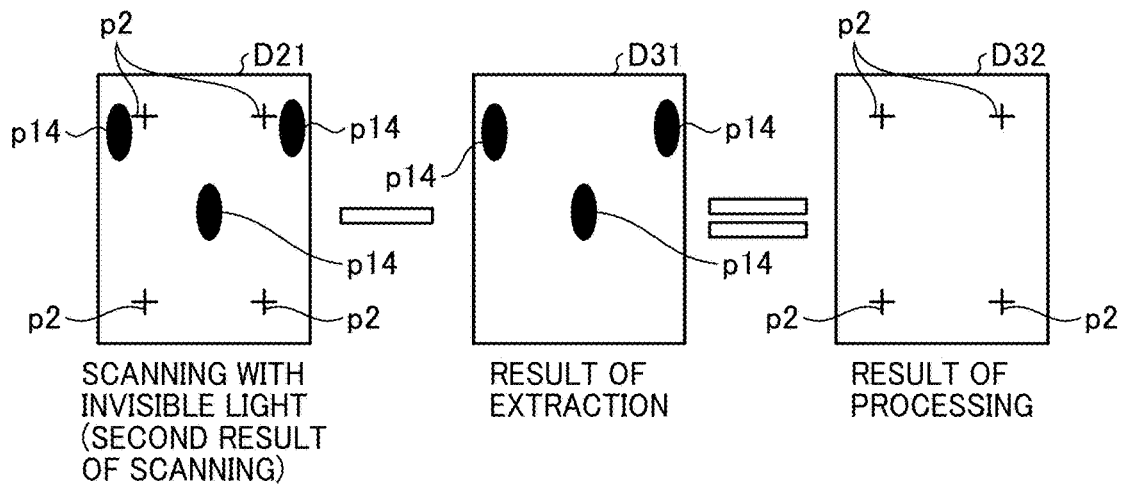

FIG. 11A, FIG. and FIG. 11C are diagrams each illustrating a method of generating a subtracted image, according to the second embodiment of the present disclosure.

FIG. 11A illustrates an image on which an M color toner image p12 and a plurality of K color toner images p14 are formed as color visible images. Operation can be performed in a similar manner even when other colors are included. Accordingly, for the sake of explanatory convenience, in the present embodiment, cases of the M color toner image p12 are described by way of example.

As illustrated in FIG. 11B and FIG. 11C, the controller 30 performs predetermined pretreatment based on the scanned color image D11 and the infrared image D21, and then calculating the difference between the two images. More specifically, firstly, as illustrated in FIG. 11B, the controller 30 performs pretreatment to extract the elements in common between the scanned color image D11 and the infrared image D21. As illustrated in FIG. 11C, the controller 30 subtracts the elements in common on the image D31, which is the image of the elements in common obtained as a result of performing pretreatment, from the infrared image D21, and detects positional displacement based on the multiple IR toner images p2 located at the four corners, which remain as a subtracted image D32. In other words, the controller 30 according to the present embodiment calculates a difference between two images, and detects positional displacement based on the obtained difference.

In FIG. 8, when the positional displacement is detected, a correction value for correcting the positional displacement of each of the multiple plates of cyan, magenta, yellow, and black (CMYK) colors is fed back from the controller 30 to the image forming engine 35. The image forming engine 35 corrects the formation positions of the images of the respective CMYK plates based on the correction values.

Figure 12:
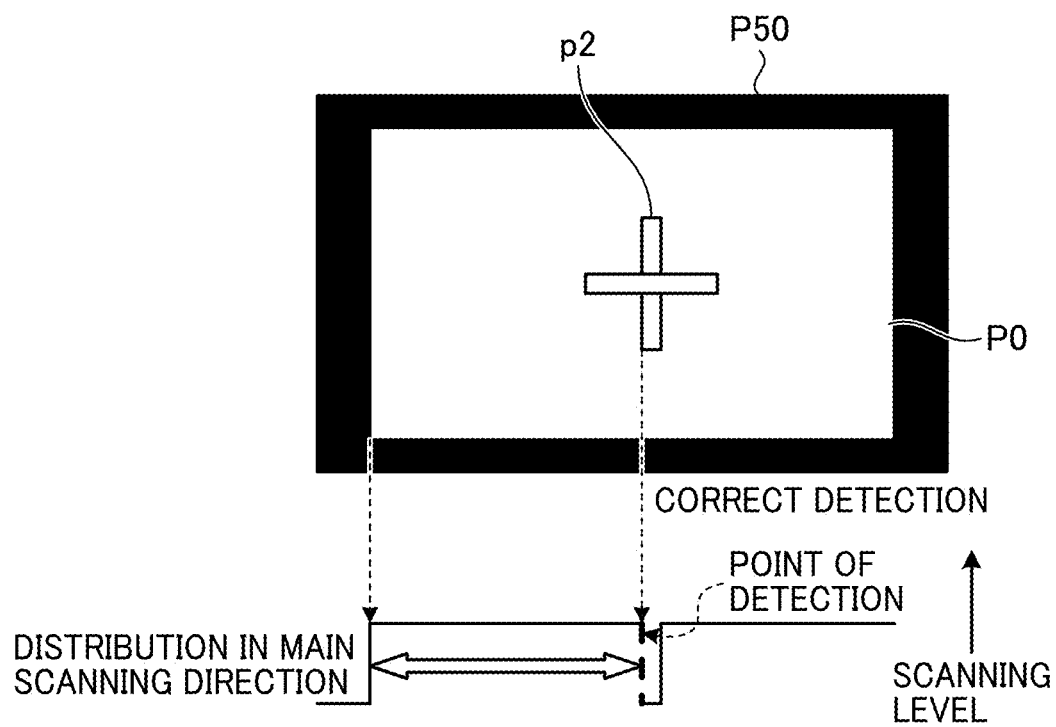
FIG. 12 is a diagram illustrating a method of detecting a positional displacement using a controller, according to an embodiment of the present disclosure.

FIG. 12 is a diagram illustrating a method of detecting positional displacement using the controller 30, according to the present embodiment.

The controller 30 detects the positional displacement based on the subtracted image D32. For the sake of explanatory convenience, only one of the multiple IR toner images p2 among the alignment images located at the four corners is illustrated in the schematic diagram of FIG. 12. The peripheral area of a recording-sheet image P0 on the subtracted image D32 is referred to as a background image P50. The background image P50 is processed so as to remain on the subtracted image D32. For example, an infrared absorbing member may be used for the background unit 500. The controller 30 may detect the boundary between the background image P50 and the recording-sheet image P0 based on the scanned color image 1311 or the infrared image D21, and may use the detected boundary position as an edge of the recording-sheet image P0. In FIG. 12, the boundary between the white area and the black area is an edge of the recording-sheet image P0.

In the subtracted image D32, the controller 30 checks the changes in the scanning level of pixels in the main scanning direction and the sub-scanning direction of the recording-sheet image P0, and detects a position where the scanning level exceeds a threshold value such as the level of the bare surface of a sheet. The main scanning direction corresponds to the width direction of the recording sheet P, and the sub-scanning direction corresponds to the length direction of the recording sheet P. In the present embodiment described with reference to FIG. 12, the controller 30 firstly detects the position where the scanning level changes from black to white in the normal direction of main scanning as an edge in the width direction of the recording sheet P, and then detects the pixels of the IR toner image p2 where the scanning level changes as the correct detection position of the alignment image. With the method according to the second embodiment of the present disclosure, the K color toner image p14 is not included in the subtracted image D32. Accordingly, the alignment image can be accurately detected.

The controller 30 according to the second embodiment of the present disclosure performs detection on the multiple alignment images at the four corners in the main scanning direction and the sub-scanning direction. As a result, the vertical lines and horizontal lines of the cross shape of the respective alignment images are detected. Note that such detection is performed from the edge side. In other words, the cross shape at the top-left corner is detected in the normal direction in the main scanning direction and is detected from above in the sub-scanning direction. Moreover, the cross shape at the top-right corner is detected in the reverse direction in the main scanning direction and is detected from above in the sub-scanning direction. The controller 30 according to the second embodiment of the present disclosure can detect, for example, displacements or bending in the position at which an image is formed, based on the four edges of the recording-sheet image P0 and the results of detection of the positions of the vertical lines and horizontal lines of the multiple alignment images at the four corners.

In the second embodiment of the present disclosure, the processes to be performed when the position sensing apparatus 61 reads an image and the controller 30 detects a plurality of alignment images are described. However, no limitation is indicated thereby, and in some modifications of the above embodiments of the present disclosure, some of or all of the detection processes of a plurality of alignment images that are performed by the controller 30 in the second embodiment of the present disclosure may be performed by the position sensing apparatus 61.

In a similar manner to the first embodiments of the present disclosure, also in the image forming apparatus according to the second embodiment of the present disclosure, the invisible alignment data can be distinguished from the other information based on the result of scanning obtained with the irradiation of visible light and the result of scanning obtained with the irradiation of invisible light. It is not always necessary to perform, for example, arrangement of information that makes u the visible image, reduction in the size of the visible image, change in color. Accordingly, an image for alignment can be detected without depending on an image-forming area such as the visible image.

First Modification of Second Embodiment

As a first modification of the second embodiment of the present disclosure, a method of detecting a plurality of alignment images adopting a method other than a method using a difference between two images is described below. For example, the controller 30 checks the scanning level of pixels of the color image D11 scanned with visible light and the infrared image D21 scanned with invisible light, as illustrated in FIG. 10A and FIG. 10B, in each of the main scanning direction and the sub-scanning direction of the recording-sheet image. Regarding an area whose read level is smaller than the scanning level of the bare surface of a sheet in the scanning with visible light, the controller 30 treats the read value of the scanning with invisible light as the level of the bare surface of a sheet. By so doing, an alignment image cart be detected.

Figure 13A:
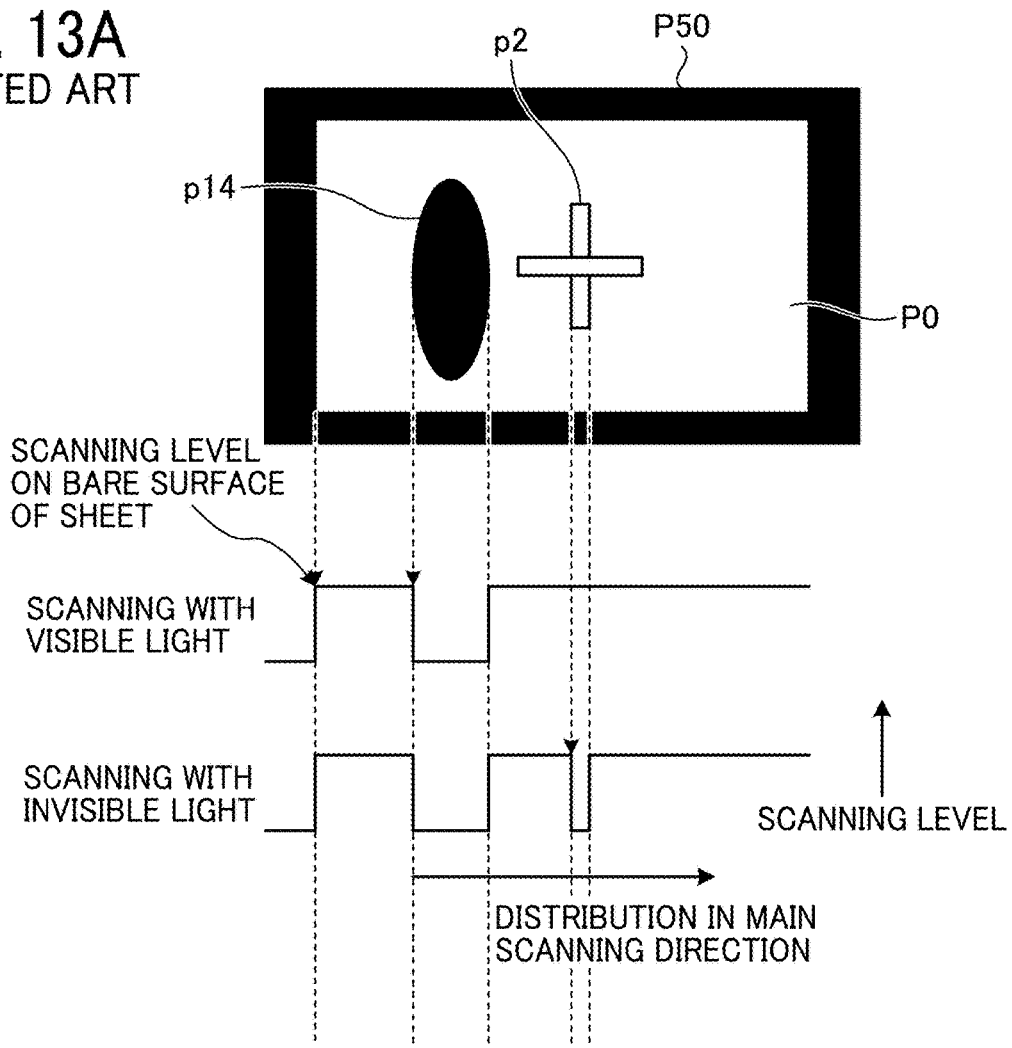
FIG. 13A is a diagram illustrating a method of detecting an alignment image according to the related art.
Figure 13B:
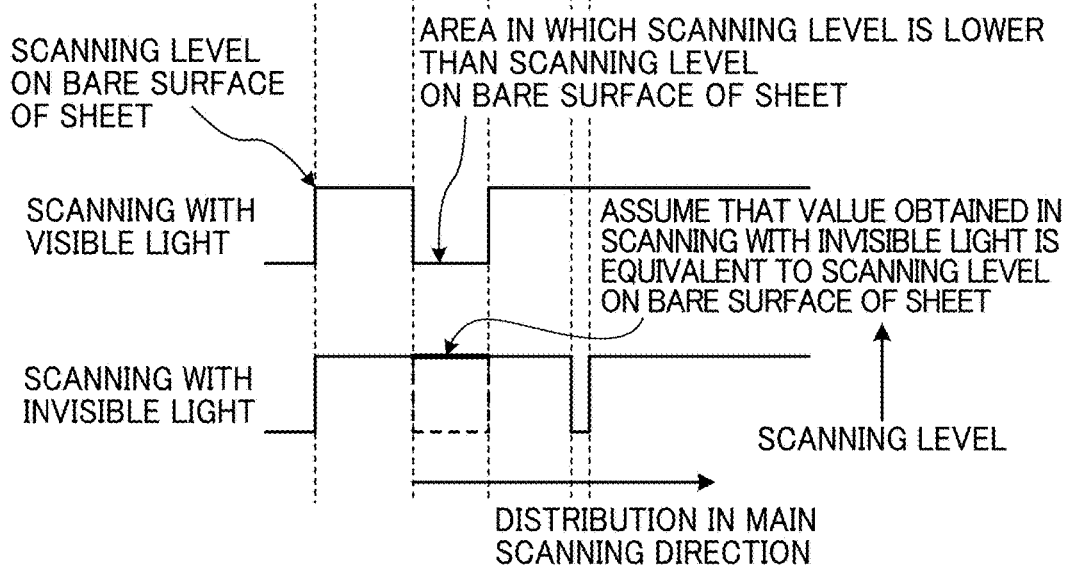
FIG. 13B is a diagram illustrating a method of detecting an alignment image according to a first modification of the second embodiment of the present disclosure.

FIG. 13A is a diagram illustrating a method of detecting an alignment image according to the related art. FIG. 13B is a diagram illustrating a method of detecting an alignment image according to the first modification of the second embodiment of the present disclosure.

For the sake of explanatory convenience, in FIG. 13A and FIG. 13B, only one of the multiple IR toner images p2 among the alignment images located at the four corners and the K and the K color toner image p14 are illustrated as the infrared image D21. The peripheral area of the recording-sheet image P0 on the infrared image D21 is also referred to as the background image P50.

As illustrated in FIG. 13A, the controller 30 according to the related art firstly detects the position where the scanning level changes from black to white in the main scanning direction as an edge in the width direction of the recording sheet P, and then detects the area where the scanning level changes as the alignment image. In the detection method according to the related art described with reference to FIG. 13A, the K color toner image p14 is located ahead of the IR toner image p2, which is an alignment image, in the main scanning direction. Accordingly, the K color toner image p14 is detected as an alignment image.

By contrast, in the method according to the first modification of the second embodiment of the present disclosure as illustrated in FIG. 13B, regarding an area whose read level is smaller than the scanning level of the bare surface of a sheet in the scanning with visible light, the controller 30 treats the read value of the scanning with invisible light as the level of the bare surface of a sheet after the boundary is detected. Due to such a configuration, the controller 30 according to the first modification of the second embodiment of the present disclosure can detect an area of the IR toner image p2 where the scanning level changes from the level of the bare surface of a sheet as the alignment image after an edge of an image scanned with invisible light is detected.

Figure 14:
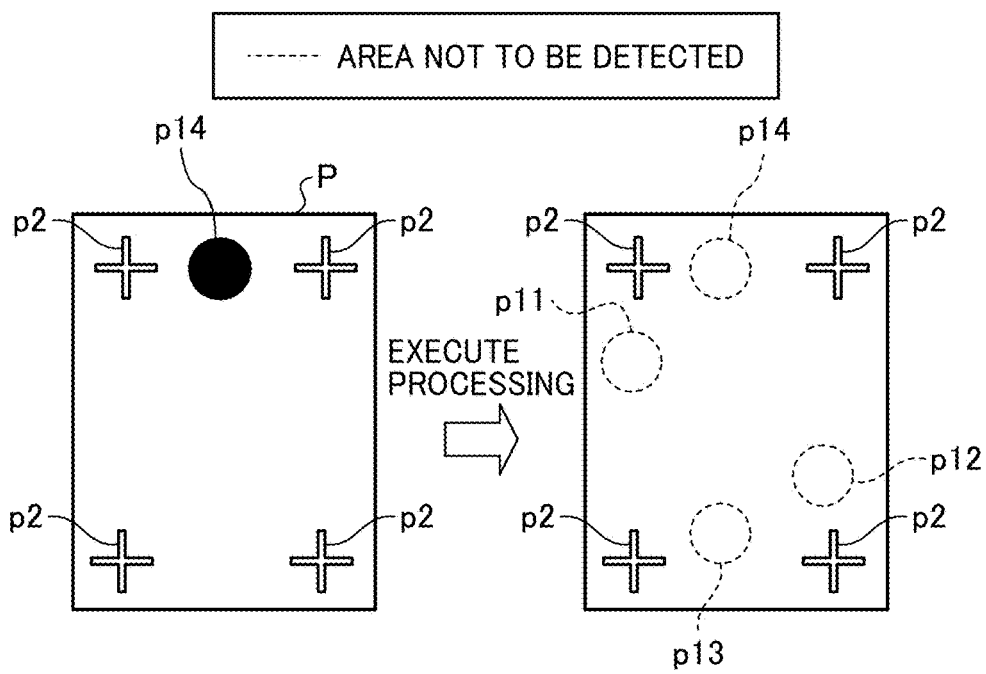
FIG. 14 is a diagram illustrating an infrared image obtained as a result of treating the read value of scanning with invisible light as the level of the bare surface of a sheet, according to the first modification of the second embodiment of the present disclosure.

FIG. 14 is a diagram illustrating the infrared image D21 obtained as a result of treating the read value of the scanning with invisible light as the level of the bare surface of a sheet, according to the first modification of the second embodiment of the present disclosure.

As illustrated in FIG. 14, the K color toner image p14 is excluded from the object to be detected. The C color toner image p11, the M color toner image p12, and the Y color toner image p13 are also set as objects not to be detected. Due to this configuration, the multiple IR toner images p2 can be detected using the above-described method.

As described above, the controller 30 according to the first modification of the second embodiment of the present disclosure can also distinguish invisible alignment data from the other information based on the result of scanning obtained with the irradiation of visible light and the result of scanning obtained with the irradiation of invisible light. Due to such a configuration, the image for alignment can be detected without depending on the image-forming area.

Second Modification of Second Embodiment

Depending on the image data, when the image forming device 50 form the multiple IR toner images p2, some of the positions at which the multiple IR toner images p2 are formed may overlap with the position at which the K color toner image p14 is formed on the visible image. In order to handle such a situation, cases where the positions at which the multiple IR toner images p2 are formed can be changed, according to a second modification of the second embodiment of the present disclosure, are described below.

Figure 15:
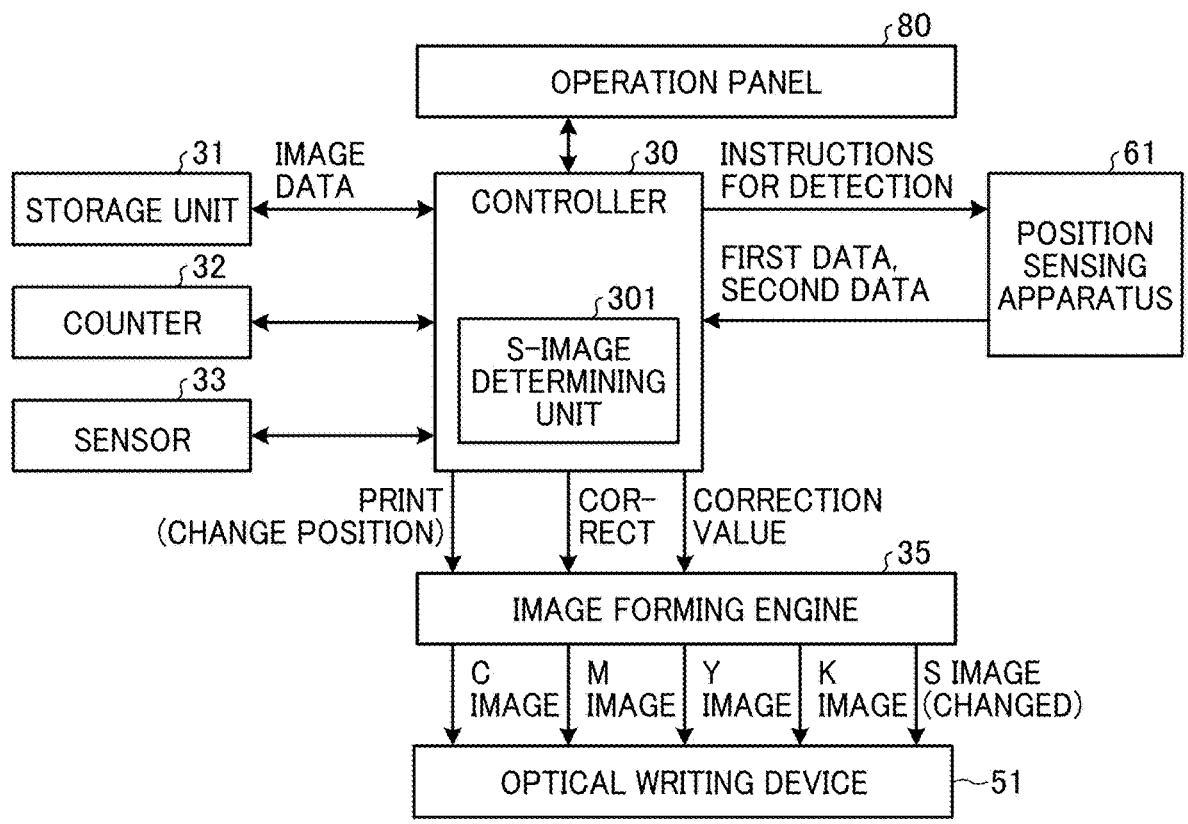
FIG. 15 is a diagram illustrating a configuration of the control blocks of an image forming apparatus according to a second modification of the second embodiments of the present disclosure.

FIG. 15 is a diagram illustrating a configuration of the control blocks of the image forming apparatus 2 according to a second modification of the second embodiments of the present disclosure.

In FIG. 15, the configuration or structure that is described as above with reference to FIG. 8 is modified. The configuration or structure similar to that of the second embodiment described with reference to FIG. 8 may be omitted where appropriate, and the configuration or structure that is different from that of the second embodiment described with reference to FIG. 8 will be described.

The controller 30 according to the second modification of the second embodiment of the present disclosure is provided with an S-image determining unit 301. The S-image determining unit 301 determines whether the image of the K plate of the print data overlaps the image of the S plate at the fixed position. When it is determined that the images overlap with each other, the S-image determining unit 301 changes the position of the image of the S plate to a position that does not overlap.

Figure 16A:
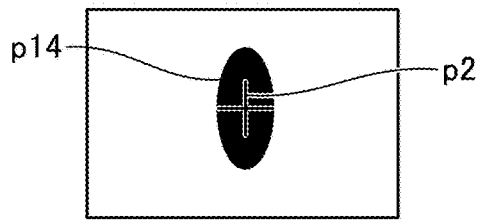
FIG. 16A and FIG. 16B are diagrams illustrating a case in which a K plate image of print data overlaps with an S plate image at a fixed position, according to a second modification of the second embodiment of the present disclosure.
Figure 16B:
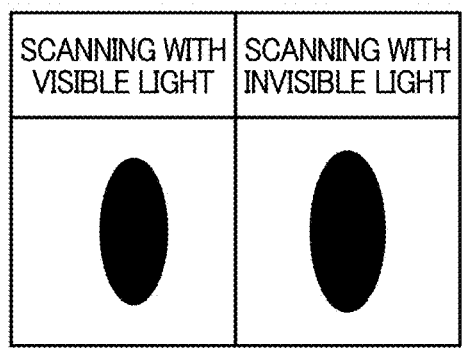

FIG. 16A and FIG. 16B are diagrams illustrating a case in which a K plate image of the print data overlaps with an S plate image at a fixed position, according to the second modification of the second embodiment of the present disclosure.

As illustrated in FIG. 16A, the K color toner image p14 of the K plate and the IR toner image p2 of the S plate may overlap with each other. In the present modification of the second embodiment of the present disclosure, the entirety of the cross shape that serves as the alignment image p2 overlaps with the K color toner image p14. However, no limitation is intended thereby, and some of the cross shape that serves as the alignment image p2 may overlap with the K color toner image p14. Although it depends on the alignment method, basically, the alignment is performed using the entirety of the cross shape. For this reason, when at least some of the cross shape overlaps with the K color toner image p14, the position of the IR toner image p2 that serves as an image for alignment is changed to a different position so as not to overlap with the K color toner image p14. When some specific portion of the cross shape is allowed to overlap with the K color toner image p14 and such a specific portion of the cross shape overlaps with the K color toner image p14, it is not necessary to change the position of the cross shape.

In the case of the present modification of the second embodiment of the present disclosure as illustrated in FIG. 16A, the result of scanning is equivalent to each other between the scanning with visible light and the scanning with invisible light, and the cross shape of the IR toner image p2 is hidden by the K color toner image p14 as illustrated in FIG. 16B. In such cases, the alignment image p2 cannot be detected from the results of scanning with visible light and the results of scanning with invisible light. In order to handle such a situation, the position of the IR toner image p2 is changed.

Figure 17:
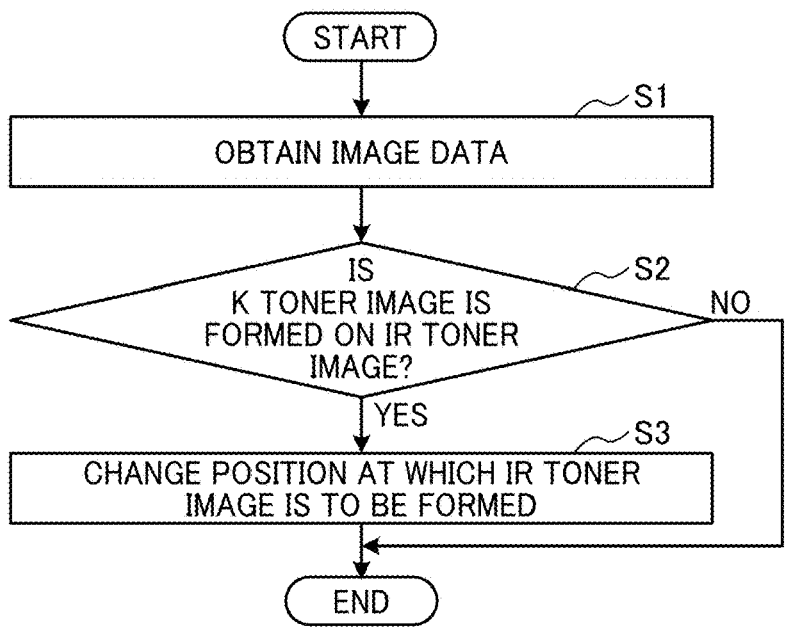
FIG. 17 is a flowchart of the processes of changing the position of an image by a controller, according to the second modification of the second embodiment of the present disclosure.

FIG. 17 is a flowchart of the processes of changing the position of an image by the controller 30, according to the second modification of the second embodiment of the present disclosure.

Firstly, in a step S1, the controller 30 according to the second modification of the second embodiment of the present disclosure obtains image data. Secondly, in a step S2, the controller 30 according to the second modification of the second embodiment of the present disclosure determines whether the K color toner image p14 is formed on any one of the multiple IR toner images p2 based on the obtained image data.

When it is determined that the K color toner image p14 is not formed on none of the multiple IR toner images p2 ("NO" in the step S2), the controller 30 according to the second embodiment of the present disclosure terminates the processes of changing the position of the IR toner image p2, and instructs the image forming engine 35 to print the image.

On the other hand, when it is determined that the K color toner image p14 is formed on one of the multiple IR toner images p2 ("YES" in the step S2), in a step S3, the controller 30 according to the second modification of the second embodiment of the present disclosure changes the position at which the IR toner image p2 is to be formed. When the multiple IR toner images p2 are formed at a plurality of positions, the controller 30 according to the second modification of the second embodiment of the present disclosure determines whether the K color toner image p14 is formed on each one of the positions at which the multiple IR toner images p2 are formed, and changes the position of the IR toner image p2 on which the K color toner image p14 is formed, on a one-by-one basis. When the image forming engine 35 is instructed to print an image, the controller 30 according to the second modification of the second embodiment of the present disclosure instructs the image forming engine 35 to change the position at which the IR toner image p2 is to be formed.

FIG. 18A, FIG. 18B, FIG. 18C, and FIG. 18D are diagrams illustrating how the position of one of the multiple IR toner images changes when the K color toner image overlaps with the IR toner image, according to the second modification of the second embodiment of the present disclosure.

Figure 18A:
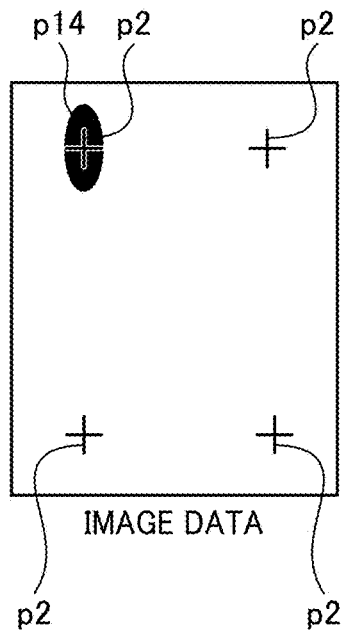
FIG. 18A, FIG. 18B, FIG. 18C, and FIG. 18D are diagrams illustrating how the position of one of a plurality of infrared (IR) toner images changes when a K color toner image overlaps with the IR toner image, according to the second modification of the second embodiment of the present disclosure.
Figure 18B:
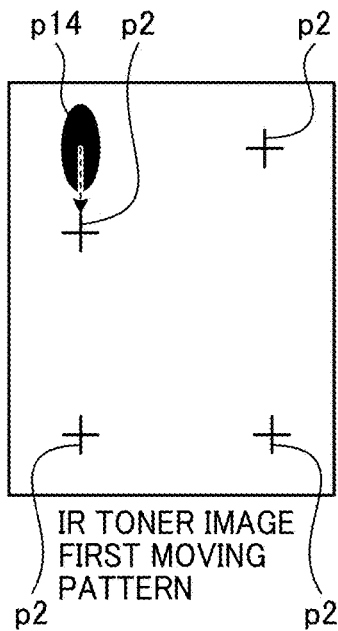
Figure 18C:
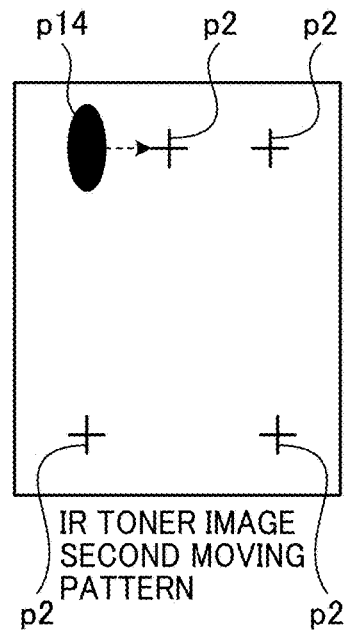
Figure 18D:
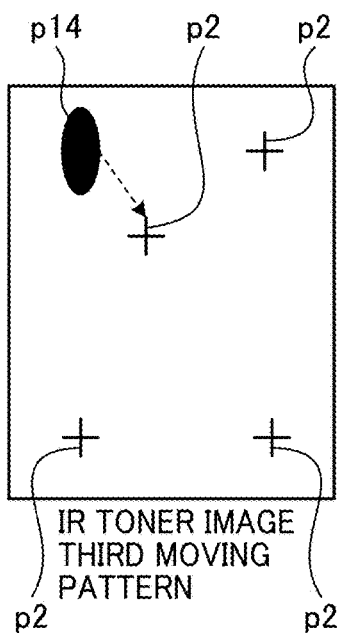

FIG. 18A, FIG. 18B, FIG. 18C, and FIG. 18D illustrate how the position changes with reference to the example arrangement described above with reference to FIG. 16A. FIG. 18A illustrates a printing when the position of any image is not changed, according to the second modification of the second embodiment of the present disclosure. FIG. 18B illustrates a printing when the position of an image is changed in the sub-scanning direction, according to the second modification of the second embodiment of the present disclosure. FIG. 18C illustrates a printing when the position of an image is changed in the main scanning direction, according to the second modification of the second embodiment of the present disclosure. FIG. 18D illustrates a printing when the position of an image is changed toward the center of the image data, according to the second modification of the second embodiment of the present disclosure. The arrows with dotted lines in these drawings indicate the moving direction of the position of the IR toner image set at the same position as the K color toner image.

Figure 19A:
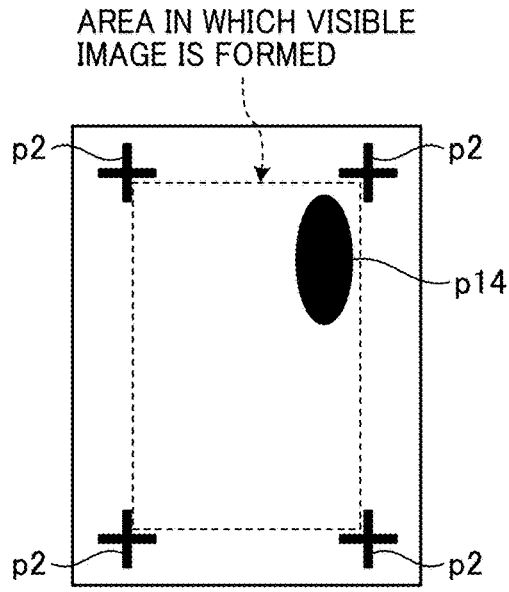
FIG. 19A and FIG. 19B are diagrams illustrating the image-forming area determined by changing the positions of a plurality of IR toner images, according to the second modification of the second embodiment of the present disclosure.
Figure 19B:
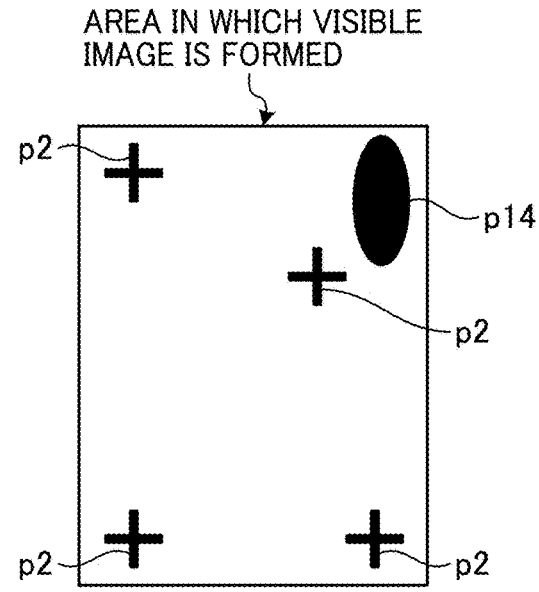

FIG. 19A and FIG. 19B are diagrams each illustrating the image forming area determined by changing the positions of a plurality of IR toner images p2, according to the second modification of the present embodiment of the present disclosure.

For the purposes of comparing with the embodiments of the present disclosure, FIG. 19A illustrates an image-forming area with respect to an object when a position detection method according to the related art. The image-forming area is indicated by a rectangular area drawn by dotted lines. As illustrated in FIG. 19A, the image-forming area according to the related art is limited to the area within the rectangle formed by the four IR toner images p2 printed at the four corners. The K color toner image p14 is also arranged inside the image-forming area in the related art. By contrast, in the second modification of the second embodiment of the present disclosure as illustrated in FIG. 19B, some of the positions at which the multiple IR toner images p2 are printed can be changed. Due to this configuration, the image-forming area that includes the areas at which the K color toner images p14 are printed is substantially not limited. In other words, due to such a configuration, the image for alignment can be detected without depending on the image-forming area. As no dependency is present on the image-forming area according to the second modification of the second embodiment of the present disclosure, the image-forming area can be made wide.

Third Modification of Second Embodiment

In the second modification of the second embodiment of the present disclosure, as described above, when some of the positions at which the multiple IR toner images are formed overlaps with the position at which the K color toner image is formed on the visible image, the position at which the IR toner image is formed is changed. However, as the color of the K color toner is black, it is also possible to form a pseudo black image using the cyan, magenta, and yellow (CMY) color toner. In view of these circumstances, in the third modification of the second embodiment of the present disclosure, a C color toner image, an M color toner image, and a Y color toner image make up the K color toner image p14 that is a black image in the visible range. In the third modification of the second embodiment of the present disclosure, when it is determined that the K color toner image p14 is formed on one of the multiple IR toner images p2, the S-image determining unit 301 of the controller 30 does not give instructions to change the position of any image, but gives instructions to perform printing upon changing the K color toner image to the CMY color toner image. As the other configurations or structures are equivalent to the configuration or structure described above with reference to FIG. 15, the illustration and description of the control blocks are omitted.

Figure 20:
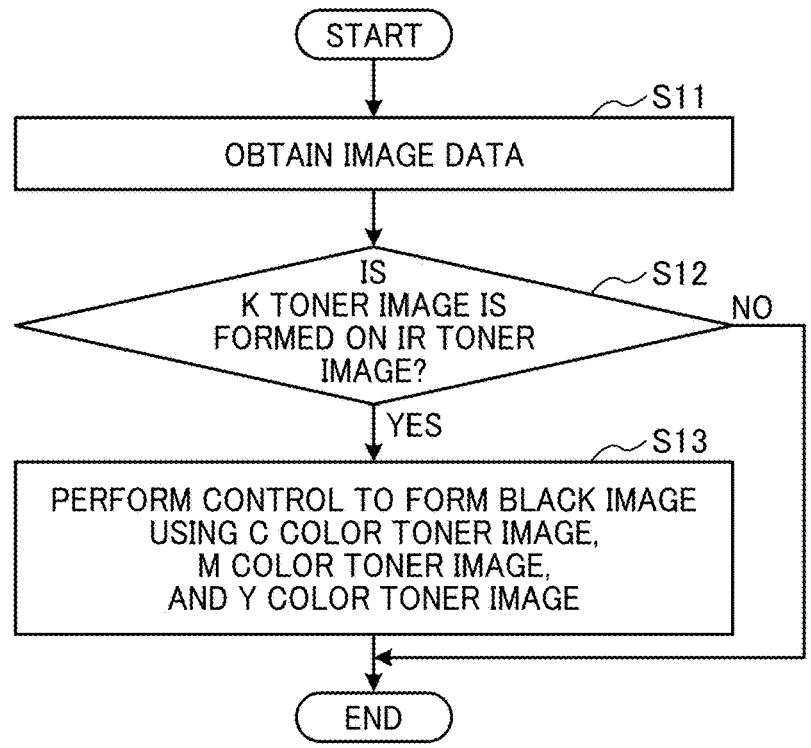
FIG. 20 is a flowchart of the changing processes performed by a controller, according to a third modification of the second embodiment of the present disclosure.

FIG. 20 is a flowchart of the changing processes performed by the controller 30, according to a third modification of the second embodiment of the present disclosure.

Firstly, in a step S11, the controller 30 according to the third modification of the second embodiment of the present disclosure obtains image data, and in a step S12, determines whether any K color toner image is formed on the IR toner image based on the obtained image data.

When it is determined that the K color toner image p14 is not formed on one of the multiple IR toner images p2 ("NO" in the step S12), the controller 30 according to the third modification of the second embodiment of the present disclosure terminates the changing process, and instructs the image forming engine 35 to print an image based on the image data.

On the other hand, when it is determined that the K color toner image p14 is formed on one of the multiple IR toner images p2 ("YES" in the step S12), in a step S13, the controller 30 according to the third modification of the second embodiment of the present disclosure performs control to form the K color toner image p14 that is a black image, using cyan, magenta, and yellow (CMY) color toner. In other words, the controller 30 instructs the image forming engine 35 to form the K color toner image p14, using C color toner image, M color toner image, and Y color toner image.

Figure 21A:
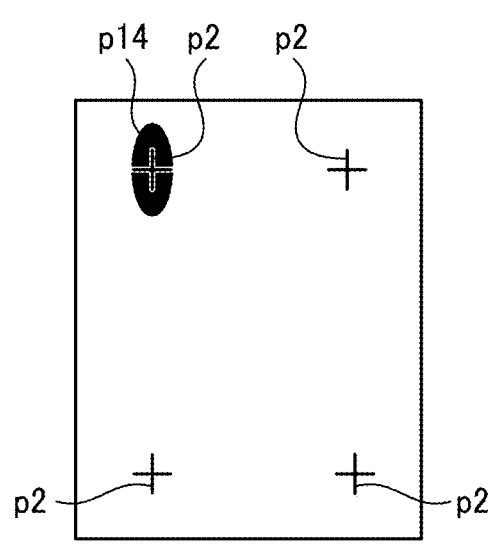
FIG. 21A and FIG. 21B are diagrams illustrating an effect of the positional change of an image when a K color toner image overlaps with an IR toner image, according to the second modification of the second embodiment of the present disclosure.
Figure 21B:
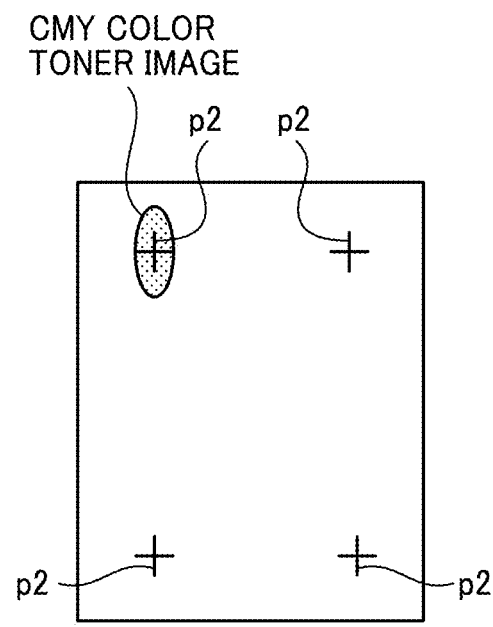

FIG. 21A and FIG. 21B are diagrams illustrating an effect of the positional change of an image when the K color toner image p14 overlaps with the IR toner image p2, according to the second modification of the second embodiment of the present disclosure.

FIG. 21A illustrates a case in which no image is changed, according to the second modification of the second embodiment of the present disclosure. FIG. 21B illustrates a case in which an image is changed, according to the second modification of the second embodiment of the present disclosure.

In FIG. 21A, no image is changed. Accordingly, the IR toner image p2 and the K color toner image p14 cannot be distinguished from each other based on the result of scanning. By contrast, in FIG. 21B, an image is changed. Accordingly, the IR toner image p2 remains as the K color toner image p14 is not included in the second result of scanning. As a result, the IR toner image p2 can be distinguished from the K color toner image p14.

Other Modifications

In the above embodiments of the present disclosure or the modifications of those embodiments of the present disclosure, the image forming apparatus detects, for example, the displacement or bending of the position at which an image is formed in the main scanning direction and the sub-scanning direction, using the cross-shaped marks of the multiple alignment images p2 at the four corners. However, such a detection method is given by way of example, and no limitation is intended thereby. As long as, for example, the displacement or bending of the position at which an image is formed can be detected, the number of cross-shaped marks may be reduced by changing, for example, the arrangement of those cross-shaped marks. Alternatively, the shape of the marks may be changed, or the scanning method may be modified.

In the above embodiments of the present disclosure or the modifications of those embodiments of the present disclosure, the image forming apparatuses each of which is provided with a tandem image forming unit are described. However, the image forming apparatuses are not limited to the ones provided with a tandem system, and may be, for example, image forming apparatuses each of which is provided with a rotary image forming unit.

In the second embodiment of the present disclosure, the position sensing apparatus is applied to the image forming apparatus 2 that serves as a printer. However, no limitation is indicated thereby, and the position sensing apparatus according to the above embodiments of the present disclosure and their modifications of those embodiments of the present disclosure may be applied to an image processing apparatus such as a multifunction peripheral (MFP) that has at least two of a photocopying function, a printing function, a scanning function, and a facsimile (FAX) function.

In the above description, some preferred embodiments of the present disclosure and the modifications of those embodiments of the present disclosure are described. However, the description of the above embodiments and the modifications of those embodiments is given by way of example, and no limitation is intended thereby.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A position sensing apparatus comprising:
a scanner configured to emit light to an object to scan an image of the object; and
a position detector,
wherein the scanner is configured to output a first result of scanning obtained by irradiating the object with visible light and a second result of scanning obtained by irradiating the object with invisible light to the position detector, and
wherein the position detector is configured to correct the second result of scanning based on the first result of scanning, and to detect an invisible alignment image based on the corrected second result of scanning.

2. The position sensing apparatus according to claim 1, wherein the position detector is configured to extract an element in common between the second result of scanning and the first result of scanning, and subtract the extracted element in common from the second result of scanning to correct the second result of scanning.

3. The position sensing apparatus according to claim 1, wherein the position detector is configured to treat, as a level of a bare surface of the object in the second result of scanning, a read value of an area whose scanning level is smaller than the level of the bare surface of the object in the first result of scanning, to correct the second result of scanning.

4. An image forming apparatus comprising:
a position sensing apparatus including
a scanner configured to emit light to an object to scan an image of the object, and
a position detector; and
an image forming device configured to form an image based on an invisible alignment image detected by the position detector,
wherein the scanner is configured to output a first result of scanning obtained by irradiating the object with visible light and a second result of scanning obtained by irradiating the object with invisible light to the position detector, and
wherein the position detector is configured to correct the second result of scanning, based on the first result of scanning, and to detect the invisible alignment image based on the corrected second result of scanning.

5. The image forming apparatus according to claim 4, wherein the image forming device is configured to change a position at which the alignment image is formed, when print data to form a visible image that is an element in common between the second result of scanning and the first result of scanning at a position where the alignment image is formed is received.

6. The image forming apparatus according to claim 5, wherein the position at which the alignment image is formed is changed without depending on a forming area of the visible image with respect to the object.

7. The image forming apparatus according to claim 4, wherein the position detector is configured to convert a black image that is an element in common between the second result of scanning and the first result of scanning into a visible black image when print data to form the black image at a position where the alignment image is formed is received, and is configured to detect an invisible alignment image based on the second result of scanning of the object obtained from the visible black image by the image forming device.

8. A method of detecting a position, the method comprising:
emitting light to an object using a scanner;
obtaining a first result of scanning as the scanner irradiates the object with visible light;
obtaining a second result of scanning as the scanner irradiates the object with invisible light;
correcting the second result of scanning based on the first result of scanning, using a position detector; and detecting an invisible alignment image based on the corrected second result of scanning, using the position detector.

\* \* \* \* \*